(12) United States Patent
Chen et al.

(10) Patent No.: US 12,261,783 B2
(45) Date of Patent: Mar. 25, 2025

(54) TECHNIQUES FOR INDICATING UPLINK TRANSMISSION CAPABILITIES IN WIRELESS COMMUNICATIONS

(71) Applicant: QUALCOMM Incorporated, San Diego, CA (US)

(72) Inventors: Bo Chen, Beijing (CN); Chenxi Hao, Beijing (CN); Chao Wei, Beijing (CN); Yu Zhang, San Diego, CA (US); Ruiming Zheng, Beijing (CN); Peng Cheng, Beijing (CN); Peter Gaal, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 429 days.

(21) Appl. No.: 17/631,828

(22) PCT Filed: Aug. 16, 2019

(86) PCT No.: PCT/CN2019/101075
§ 371 (c)(1),
(2) Date: Jan. 31, 2022

(87) PCT Pub. No.: WO2021/030957
PCT Pub. Date: Feb. 25, 2021

(65) Prior Publication Data
US 2022/0278784 A1 Sep. 1, 2022

(51) Int. Cl.
*H04L 5/00* (2006.01)

(52) U.S. Cl.
CPC .......... *H04L 5/0005* (2013.01); *H04L 5/0035* (2013.01); *H04L 5/0048* (2013.01); *H04L 5/0096* (2013.01)

(58) Field of Classification Search
None
See application file for complete search history.

(56) References Cited

U.S. PATENT DOCUMENTS

| 10,333,670 B2 | 6/2019 | Rico Alvarino et al. |
| 2014/0133415 A1 | 5/2014 | Damnjanovic et al. |

(Continued)

FOREIGN PATENT DOCUMENTS

| CN | 110063078 A | 7/2019 |
| EP | 3413653 A1 | 12/2018 |

(Continued)

OTHER PUBLICATIONS

Supplementary European Search Report—EP19941978—Search Authority—The Hague—Apr. 5, 2023.

(Continued)

*Primary Examiner* — Alpus Hsu
*Assistant Examiner* — Camquyen Thai
(74) *Attorney, Agent, or Firm* — Arent Fox LLP/Qualcomm Incorporated

(57) ABSTRACT

Aspects described herein relate to transmitting an indication of a capability to support concurrent or time division multiplexed uplink transmission of at least one of multiple uplink channels across multiple component carriers. In addition, a configuration to transmit over the at least one of the multiple uplink channels over the multiple component carriers using concurrent transmission or time division multiplexed transmission can be received based on the indication.

30 Claims, 7 Drawing Sheets

(56) References Cited

U.S. PATENT DOCUMENTS

| | | | |
|---|---|---|---|
| 2014/0162642 A1* | 6/2014 | Kwon | H04W 8/24 |
| | | | 455/435.1 |
| 2015/0312789 A1 | 10/2015 | You et al. | |
| 2016/0143035 A1* | 5/2016 | Xue | H04L 5/001 |
| | | | 370/329 |
| 2016/0302203 A1 | 10/2016 | Liu et al. | |
| 2018/0020441 A1* | 1/2018 | Lo | H04W 40/244 |
| 2018/0324778 A1 | 11/2018 | Farajidana et al. | |
| 2019/0059075 A1* | 2/2019 | Hayashi | H04L 5/0092 |
| 2019/0305914 A1 | 10/2019 | Lee et al. | |

FOREIGN PATENT DOCUMENTS

| | | | |
|---|---|---|---|
| WO | 2017192232 A1 | 11/2017 | |
| WO | 2019037158 A1 | 2/2019 | |

OTHER PUBLICATIONS

Mediatek, Inc., "Discussion about LTE-A UE Capability" 3Gpp TSG RAN WG4 Meeting 3GPPRAN4 AH#04 R4-103667, Oct. 15, 2010.

International Search Report and Written Opinion issued in corresponding International Application No. PCT/CN2019/101075 dated May 19, 2020.

* cited by examiner

TECHNIQUES FOR INDICATING UPLINK TRANSMISSION CAPABILITIES IN WIRELESS COMMUNICATIONS

This application is a 35 U.S.C. § 371 National Phase of International Application No. PCT/CN2019/101075, entitled "TECHNIQUES FOR INDICATING UPLINK TRANSMISSION CAPABILITIES IN WIRELESS COMMUNICATIONS," filed Aug. 16, 2019, which is assigned to the assignee hereof, and incorporated by reference herein for all purposes.

BACKGROUND

Aspects of the present disclosure relate generally to wireless communication systems, and more particularly, to indicating uplink transmission capabilities for transmitting over multiple component carriers (CCs).

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In some wireless communication technologies, carrier aggregation (CA) or multiple connectivity can be supported to allow a user equipment (UE) to communicate with a network using multiple component carriers (CC) established with one or more cells.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for wireless communication is provided. The method includes transmitting an indication of a capability to support concurrent or time division multiplexed uplink transmission of at least one of multiple uplink channels across multiple component carriers, transmitting a second indication of at least one of a number of physical antennas or a number of transmission layers of the at least one of the multiple uplink channels supported for each of the multiple component carriers or each of multiple combinations of the multiple component carriers, and receiving, based on the indication and the second indication, a configuration to transmit over the at least one of the multiple uplink channels over the multiple component carriers using concurrent transmission or time division multiplexed transmission.

In another example, a method for wireless communication includes receiving, from a user equipment (UE), an indication of a capability to support concurrent or time division multiplexed uplink transmission of at least one of multiple uplink channels across multiple component carriers, determining, based on the indication, a configuration for the UE for transmitting over the at least one of the multiple uplink channels over the multiple component carriers using concurrent transmission or time division multiplexed transmission, and transmitting, based on the indication, the configuration to the UE.

In a further example, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
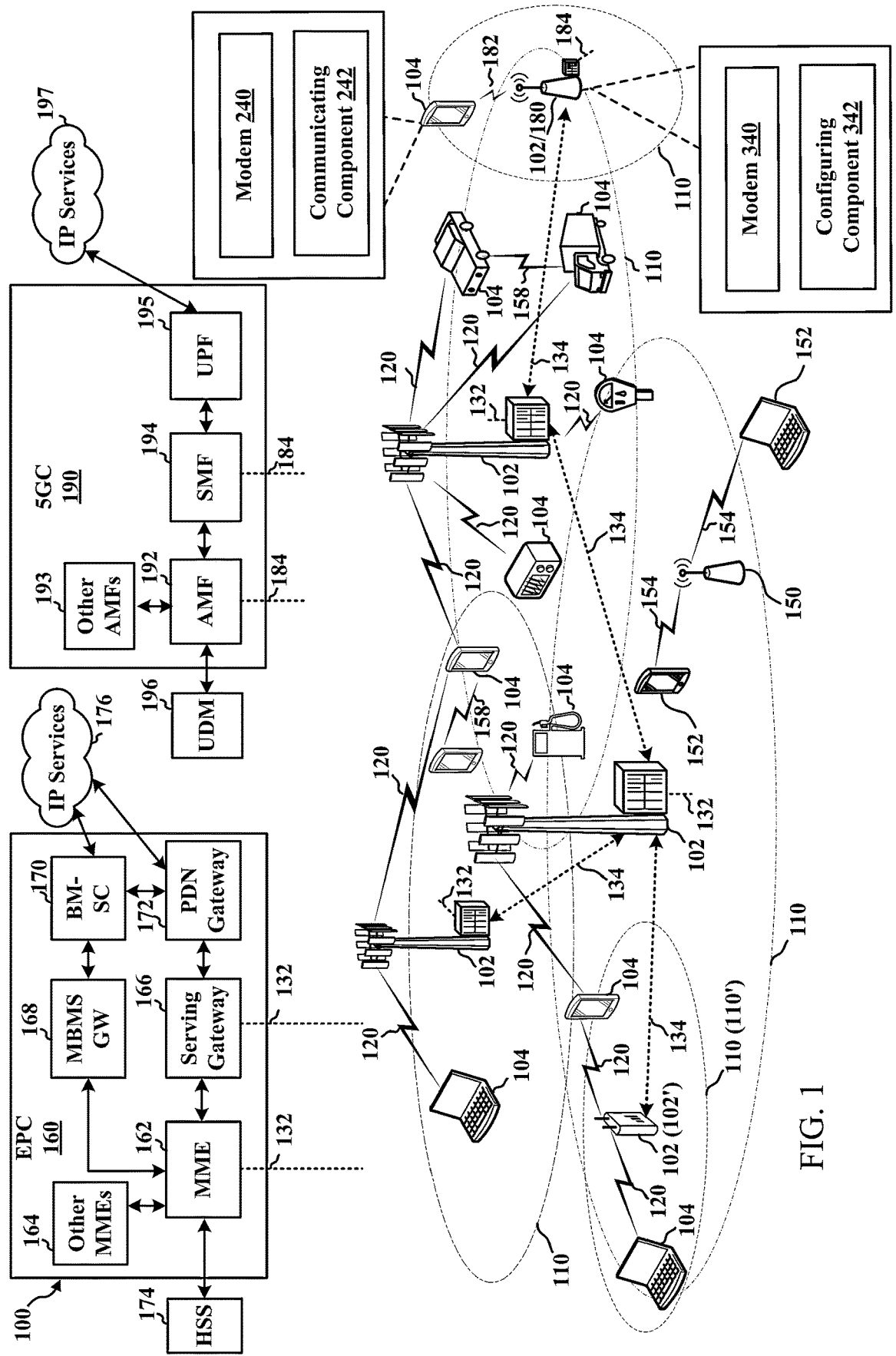
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to supporting multiple carrier aggregation operation modes in wireless communications. For example, for uplink carrier aggregation, a concurrent uplink transmission mode can be supported where a user equipment (UE) can concurrently transmit uplink communications over multiple component carriers (CCs) and/or a time division duplex (TDD, or time division multiplex (TDM)) mode can be supported where the UE can multiplex uplink transmissions over multiple CCs in time. In some examples, the UE can indicate one or more capabilities with respect to whether it can support concurrent uplink communications or TDM uplink communications over multiple CCs and/or different combinations of multiple CCs, and a network can allocate resources to the UE for transmitting uplink communications based on the one or more capabilities. For example, the one or more capabilities can indicate whether the UE supports concurrent uplink communications or TDM uplink communications for at least one of multiple uplink channels (e.g., an indicator for all channels, separate indicators for one or more of the multiple uplink channels, etc.), and the capability can be separately indicated for multiple combinations of CCs or related bands.

In additional examples, the one or more capabilities can indicate a switching time for switching between CCs in transmitting the uplink communications. In another example, the one or more capabilities can indicate a number of antennas or supported transmission layers of the at least one uplink channel per combination of multiple CCs. In yet another example, the one or more capabilities can indicate whether separate primary cell (PCell) configuration for downlink and uplink is supported for combinations of CCs. In an example, the network can receive one or more of the various capabilities, and can configure uplink communications (e.g., a resource grant) to comply with the UE capabilities. This can enable support of concurrent or TDM uplink communications for all, or separately for one or more, of a collection of uplink channels.

The described features will be presented in more detail below with reference to FIGS. 1-7.

As used in this application, the terms "component," "module," "system" and the like are intended to include a computer-related entity, such as but not limited to hardware, software, a combination of hardware and software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for indicating one or more capabilities for support uplink communications over multiple CCs. In addition, some nodes may have a modem 340 and configuring component 342 for determining one or more capabilities for support uplink communications over multiple CCs and/or accordingly configuring resource grants, etc., as described herein. Though a UE 104 is shown as having the modem 240 and communicating component 242 and a base station 102/gNB 180 is shown as having the modem 340 and configuring component 342, this is one illustrative example, and substantially any node or type of node may include a modem 240 and communicating component 242 and/or a modem 340 and configuring component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters.

The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a positioning system (e.g., satellite, terrestrial), a multimedia device, a video device, a digital audio player (e.g., MP3 player), a camera, a game console, a tablet, a smart device, robots, drones, an industrial/manufacturing device, a wearable device (e.g., a smart watch, smart clothing, smart glasses, virtual reality goggles, a smart wristband, smart jewelry (e.g., a smart ring, a smart bracelet)), a vehicle/a vehicular device, a meter (e.g., parking meter, electric meter, gas meter, water meter, flow meter), a gas pump, a large or small kitchen appliance, a medical/healthcare device, an implant, a sensor/actuator, a display, or any other similar functioning device. Some of the UEs 104 may be referred to as IoT devices (e.g., meters, pumps, monitors, cameras, industrial/manufacturing devices, appliances, vehicles, robots, drones, etc.). IoT UEs may include MTC/enhanced MTC (eMTC, also referred to as CAT-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, communicating component 242 of a UE 104 can indicate one or more capabilities for supporting concurrent or TDM transmissions over at least one of multiple uplink channels over multiple CCs, and/or one or more related capabilities, such as a carrier switching time, a number of antennas or transmission layer supported, whether separate configuration of PCell for uplink and downlink is supported, etc. Base station 102 can obtain the one or more capabilities, and configuring component 342 can accordingly configure the UE 104 with resource grants or other parameters for transmitting the at least one of the multiple uplink channels concurrently or using TDM over the multiple CCs.

Figure 2:
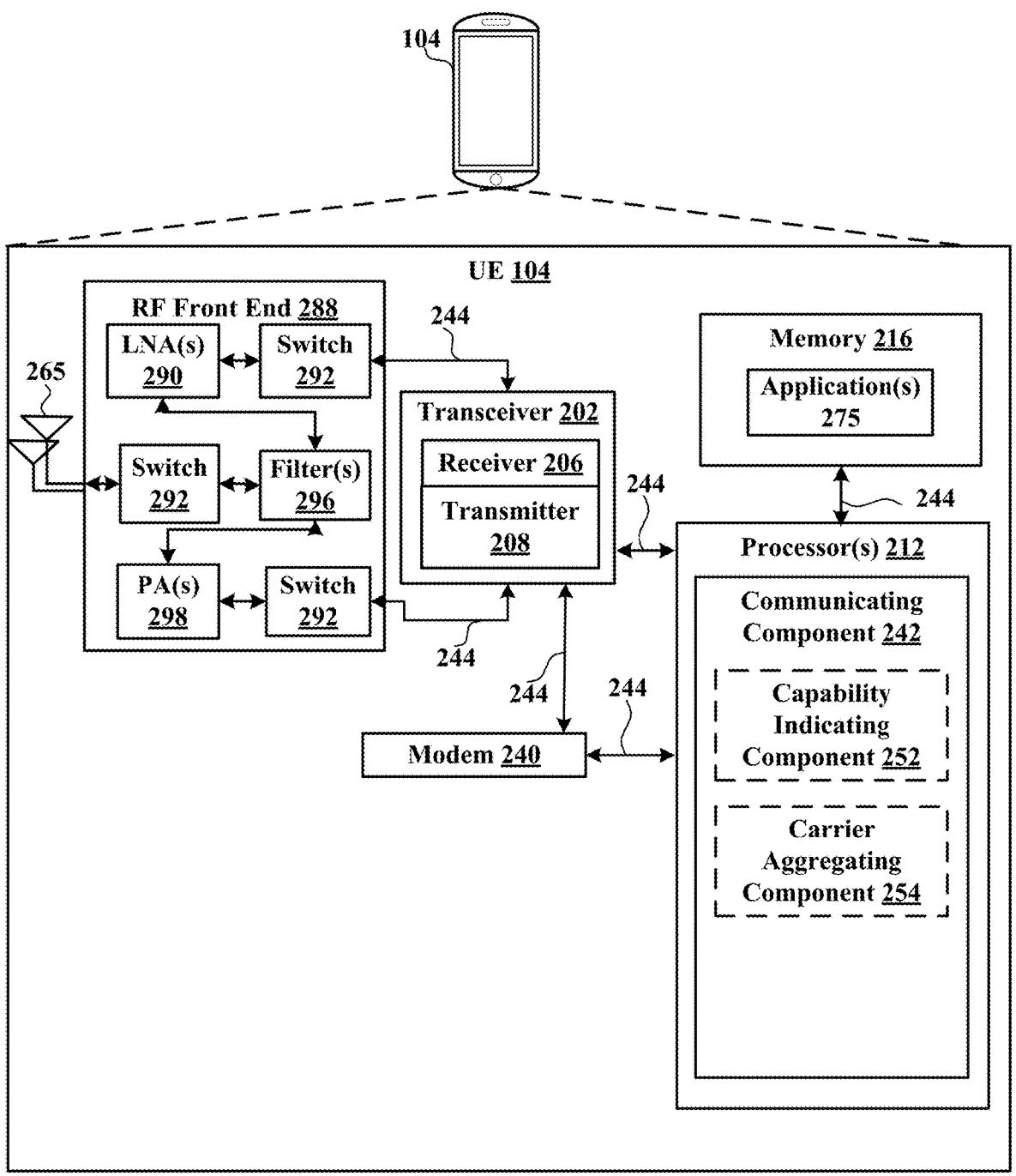
FIG. 2 is a block diagram illustrating an example of a UE, in accordance with various aspects of the present disclosure.
Figure 3:
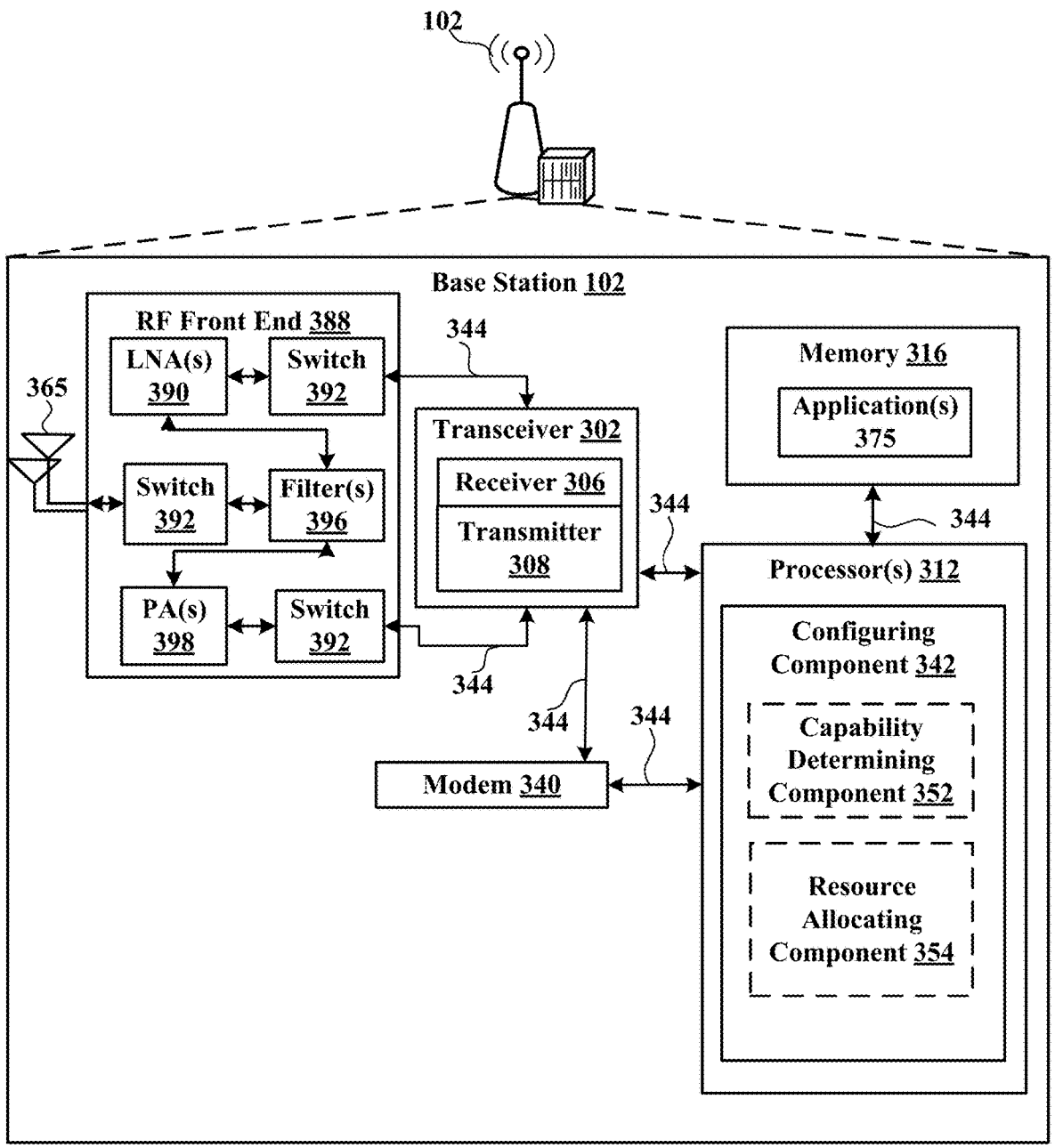
FIG. 3 is a block diagram illustrating an example of a base station, in accordance with various aspects of the present disclosure.
Figure 4:
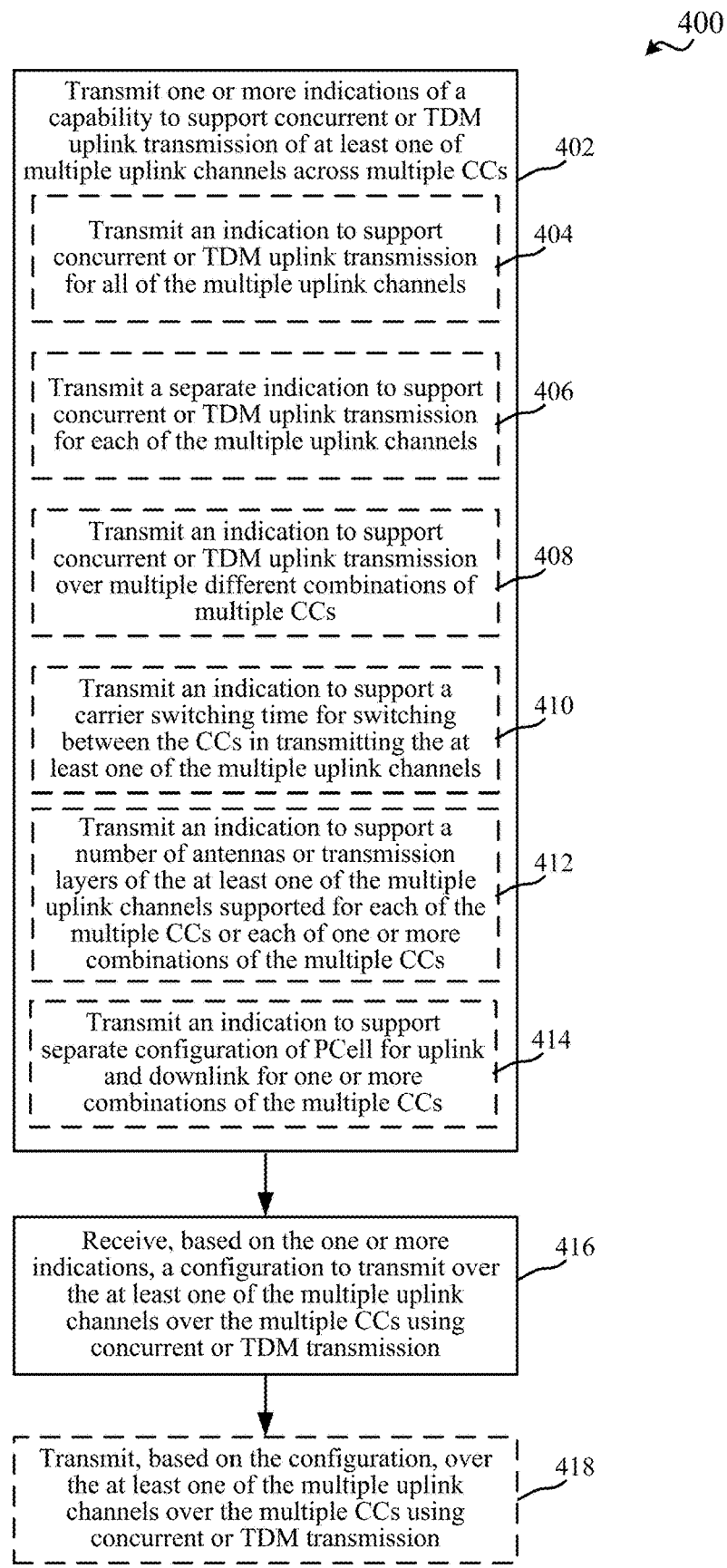
FIG. 4 is a flow chart illustrating an example of a method for indicating one or more capabilities for support uplink communications over multiple component carriers (CCs), in accordance with various aspects of the present disclosure.
Figure 5:
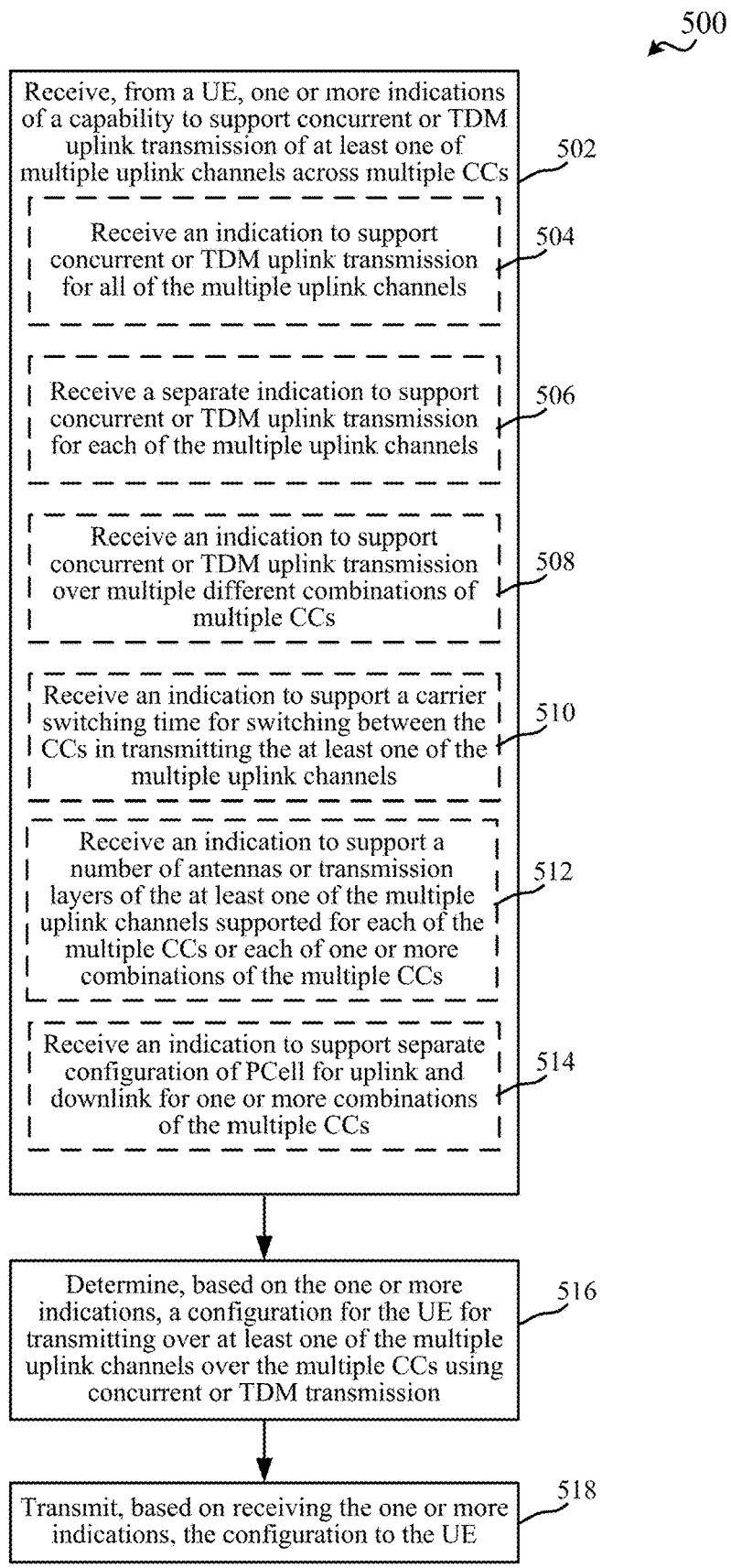
FIG. 5 is a flow chart illustrating an example of a method for determining one or more capabilities for support uplink communications over multiple CCs, in accordance with various aspects of the present disclosure.

Turning now to FIGS. 2-7, aspects are depicted with reference to one or more components and one or more methods that may perform the actions or operations described herein, where aspects in dashed line may be optional. Although the operations described below in FIGS. 4-5 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 for indicating one or more capabilities regarding transmitting concurrent or TDM transmissions of at least one of multiple uplink channels over multiple configured CCs.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware and/or software executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware and/or software executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include a capability indicating component 252 for indicating one or more capabilities related to transmitting at least one of multiple uplink channels concurrently or using TDM over multiple CCs, or a carrier aggregating component 254 for transmitting the at least one uplink channel over the multiple CCs using concurrent or TDM communications.

In an aspect, the processor(s) 212 may correspond to one or more of the processors described in connection with the UE in FIG. 7. Similarly, the memory 216 may correspond to the memory described in connection with the UE in FIG. 7.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and configuring component 342 for determining, for a UE, one or more capabilities regarding transmitting concurrent or TDM transmissions of at least one of multiple uplink channels over multiple configured CCs.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, configuring component 342 can optionally include a capability determining component 352 for determining one or more capabilities related to a UE transmitting at least one of multiple uplink channels concurrently or using TDM over multiple CCs, or a resource allocating component 354 for allocating resources over the multiple CCs to facilitate scheduling the UE, based on the determined one or more capabilities, to transmit the at least one uplink channel over the multiple CCs using concurrent or TDM communications.

In an aspect, the processor(s) 312 may correspond to one or more of the processors described in connection with the base station in FIG. 7. Similarly, the memory 316 may correspond to the memory described in connection with the base station in FIG. 7.

FIG. 4 illustrates a flow chart of an example of a method 400 for indicating one or more capabilities related to transmitting at least one of multiple uplink channels using concurrent or TDM communications over multiple CCs. FIG. 5 illustrates a flow chart of an example of a method 400 for determining one or more capabilities related to a UE transmitting at least one of multiple uplink channels using concurrent or TDM communications over multiple CCs. Methods 400 and 500 are described in conjunction with one another for ease of explanation, though the methods 400 and 500 are not required to be performed in conjunction. In an example, a UE 104 can perform the functions described in method 400 using one or more of the components described in FIGS. 1 and 2 and/or a base station 102 and/or other network component can perform the functions described in method 500 using one or more of the components described in FIGS. 1 and 3.

In method 400, at Block 402, one or more indications of a capability to support concurrent or TDM uplink transmission of at least one of multiple uplink channel across multiple CCs can be transmitted. In an aspect, capability indicating component 252, e.g., in conjunction with processor(s) 212, memory 216, transceiver 202, communicating component 242, etc., can transmit the one or more indications of the capability to support concurrent or TDM uplink transmission of at least one of multiple uplink channels across multiple CCs. For example, the multiple CCs can be configured at the UE 104 for carrier aggregation (CA) and/or multiple connectivity with one or multiple cells. For example, whether the UE 104 can support concurrent or TDM uplink transmissions for certain uplink channels can be based on hardware considerations of the UE 104 (e.g., a number or type of antennas), a subscription level associated with the UE 104 (e.g., whether the subscription is for services that can allow concurrent transmission of uplink channels), and/or other considerations. In any case, the capabilities can be specified in a memory of the UE 104, a subscription module of the UE 104, otherwise determinable, and/or the like, for communicating to the base station 102 or other network device. An example of concurrent and TDM uplink transmissions over multiple carriers is illustrated in FIG. 6.

Figure 6:
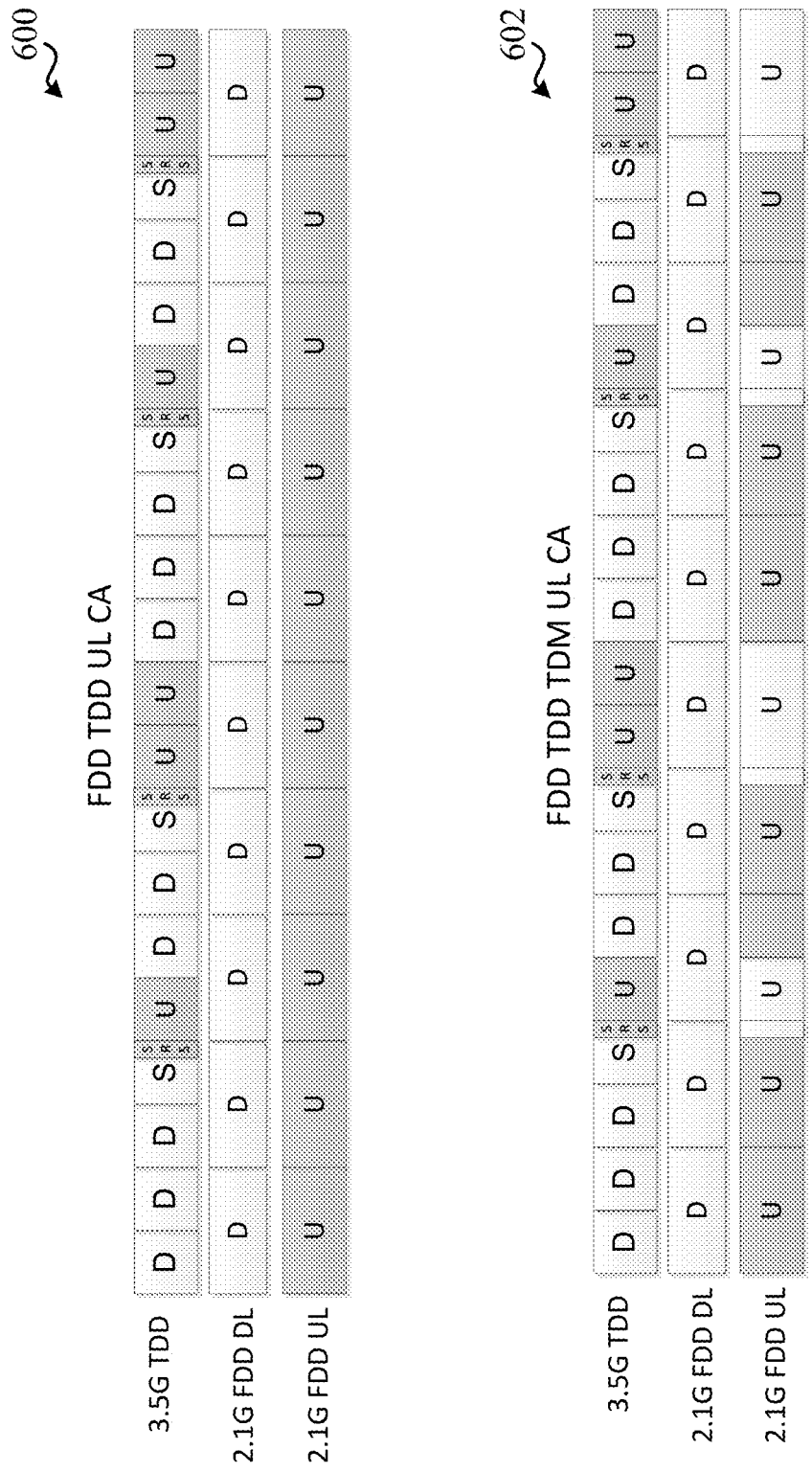
FIG. 6 illustrates an example of concurrent and time division multiplexed communications over multiple CCs, in accordance with various aspects of the present disclosure.

FIG. 6 depicts examples of resource allocations 600, 602, which can each include multiple CCs. Resource allocations 600, 602 each include a CC used for 3.5 gigahertz (G) TDD, a CC used for 2.1G FDD for downlink (DL), and a CC used for 2.1G FDD for uplink (UL). In resource allocation 600, uplink transmissions can be supported or can otherwise occur concurrently (as indicated in the grey uplink resources) on the 3.5G TDD CC and the 2.1G FDD UL CC. In resource allocation 602, uplink transmissions can be supported or can otherwise occur as time division duplexed (as indicated in the grey uplink resources) on the 3.5G TDD CC and the 2.1G FDD UL CC (e.g., such that only one CC is used at a time for uplink transmission). Concurrent uplink transmission configuration at resource allocation 600 can be associated with higher cost and higher hardware complexity, but can provide an improved uplink performance over TDM. TDM uplink transmission configuration at resource allocation 602 can be associated with lower cost and lower hardware complexity, but can provide sub-optimal uplink performance when compared with concurrent UL transmissions.

Both types of UL CA operations can be supported in wireless network (e.g., concurrent and TDM). Network can support both concurrent UL Tx or TDM UL Tx through network dynamic scheduling. The network can consider the signaled UE radio access capability parameters when configuring the UE and when scheduling the UE, as described further herein. In an example, capability indicating component 252 can transmit UE capability information in an RRC message that is sent to network (e.g., during an initial registration process for the UE), to inform of certain capabilities of the UE 104. In an example, capability indicating component 252 can indicate capability of whether the UE 104 supports parallel transmission of sounding reference signal (SRS) and physical uplink control channel (PUCCH)/physical uplink shared channel (PUSCH) across CCs in an inter-band CA band combination through a parameter "parallelTxSRS-PUCCH-PUSCH" in CA-ParametersNR, as defined in fifth generation (5G) new radio (NR) Release 15. In another example, capability indicating component 252 can indicate capability of whether the UE supports parallel transmission of physical random access channel (PRACH) and SRS/PUCCH/PUSCH across CCs in an inter-band CA band combination through a parameter "parallelTxPRACH-SRS-PUCCH-PUSCH" in CA-ParametersNR, as defined in NR Release. Described herein are aspects related to reporting capability for supporting concurrent or TDM UL transmission of PUSCH across CCs in an inter-band CA band combination, concurrent or TDM UL transmission of PUCCH across CCs in an inter-band CA band combination, concurrent or TDM UL transmission of SRS across CCs in an inter-band CA band combination, concurrent or TDM UL transmission of PRACH across CCs in an inter-band CA band combination, etc.

Thus, for example, in transmitting the one or more indications at Block 402, optionally at Block 404, an indication to support concurrent or TDM uplink transmissions for all of the multiple uplink channels can be transmitted. In an aspect, capability indicating component 252, e.g., in conjunction with processor(s) 212, memory 216, transceiver 202, communicating component 242, etc., can transmit the indication to support concurrent or TDM uplink transmissions for all of the multiple uplink channels. In an example, the capabilities can relate to a set of multiple uplink channels, such as PUSCH, PUCCH, SRS, and PRACH. In an example, capability indicating component 252 can transmit the indication of the capability as applying to all uplink channels in the set (e.g., to all of PUSCH, PUCCH, SRS, and PRACH, in one example). For example, the indication may include an indication of supporting concurrent or TDM uplink transmissions for all of the multiple uplink channels over one or more combinations of the multiple CCs. For example, the capability indication may be similar to the following:

| Maximum # of concurrently UL Tx CCs | Band Combination Index |
|---|---|
| N = 1 | 1(CC1 + CC2) |
| N = 2 | 2(CC3 + CC4) | which can be a single indication field for indicating supported maximum concurrent UL TX for all UL channels, i.e. PUSCH/PUCCH/SRS/PRACH. In this example, for an intra/inter-band CA band combination: (for 2CCs case, N=1 can indicate TDM UL TX capability, N=2 can indicate concurrent UL Tx Capability).

In another example, in transmitting the one or more indications at Block 402, optionally at Block 406, a separate indication to support concurrent or TDM uplink transmissions for each of the multiple uplink channels can be transmitted. In an aspect, capability indicating component 252, e.g., in conjunction with processor(s) 212, memory 216, transceiver 202, communicating component 242, etc., can transmit the separate indication to support concurrent or TDM uplink transmissions for each of the multiple uplink channels. In an example, the capabilities can relate to a set of multiple uplink channels, such as PUSCH, PUCCH, SRS, and PRACH. In an example, capability indicating component 252 can transmit separate indications for each of (or at least a subset of) the uplink channels in the set (e.g., to each or a subset of PUSCH, PUCCH, SRS, and PRACH, in one example). For example, the indication may include an indication of supporting concurrent or TDM uplink transmissions for each of the multiple uplink channels over one or more combinations of the multiple CCs. For example, the capability indication may be similar to the following for PUSCH:

| Channel Indication | Maximum # of concurrently UL Tx CCs | Band Combination Index |
|---|---|---|
| PUSCH | N = 1 | 1(CC1 + CC2) |
|  | N = 2 | 2(CC3 + CC4) |

In this example, for an intra/inter-band CA band combination: (for 2CCs case, N=1 can indicate TDM UL TX capability, N=2 can indicate concurrent UL Tx Capability. Similarly, a separate indication for SRS can be similar to the following:

| Channel Indication | Maximum # of concurrently UL Tx CCs | Band Combination Index |
|---|---|---|
| SRS | N = 1 | 1(CC1 + CC2) |
|  | N = 2 | 2(CC3 + CC4) |

In another example, in transmitting the one or more indications at Block 402, optionally at Block 408, an indication to support concurrent or TDM uplink transmissions over multiple different combinations of multiple CCs can be transmitted. In an aspect, capability indicating component 252, e.g., in conjunction with processor(s) 212, memory 216, transceiver 202, communicating component 242, etc., can transmit the indication to support concurrent or TDM uplink transmissions over the multiple different combinations of multiple CCs. For example, capability indicating component 252 can indicate the capability as it applies generally to multiple CCs or to specific CCs in a band combination index field or similar indication, as described above. In an example, a base station 102 or other network component can use this information to determine how to allocate resources to the UE 104 over multiple carriers based on the capability and/or based on what bands are configured based on the capabilities.

For example, in method 500, at Block 502, one or more indications of a capability to support concurrent or TDM uplink transmission of at least one of multiple uplink channel across multiple CCs can be received from a UE. In an aspect, capability determining component 352, e.g., in conjunction with processor(s) 312, memory 316, transceiver 302, configuring component 342, etc., can receive, from the UE (e.g., UE 104), the one or more indications of the capability to support concurrent or TDM uplink transmission of at least one of multiple uplink channels across multiple CCs. For example, the multiple CCs can be configured at the UE 104 for CA and/or multiple connectivity with one or multiple cells, as described.

In one example, in receiving the one or more indications at Block 502, optionally at Block 504, an indication to support concurrent or TDM uplink transmissions for all of the multiple uplink channels can be received. In an aspect, capability determining component 352, e.g., in conjunction with processor(s) 312, memory 316, transceiver 302, configuring component 342, etc., can receive the indication to support concurrent or TDM uplink transmissions for all of the multiple uplink channels. In an example, the capabilities can relate to a set of multiple uplink channels, such as PUSCH, PUCCH, SRS, and PRACH. In an example, capability determining component 352 can receive the indication of the capability as applying to all uplink channels in the set (e.g., to all of PUSCH, PUCCH, SRS, and PRACH, in one example), as described above.

In another example, in receiving the one or more indications at Block 502, optionally at Block 506, a separate indication to support concurrent or TDM uplink transmissions for each of the multiple uplink channels can be received. In an aspect, capability determining component 352, e.g., in conjunction with processor(s) 312, memory 316, transceiver 302, configuring component 342, etc., can receive the separate indication to support concurrent or TDM uplink transmissions for each of the multiple uplink channels. In an example, the capabilities can relate to a set of multiple uplink channels, such as PUSCH, PUCCH, SRS, and PRACH. In an example, capability determining component 352 can receive separate indications for each of (or at least a subset of) the uplink channels in the set (e.g., to each or a subset of PUSCH, PUCCH, SRS, and PRACH, in one example), as described.

In another example, in receiving the one or more indications at Block 502, optionally at Block 508, an indication to support concurrent or TDM uplink transmissions over multiple different combinations of multiple CCs can be received. In an aspect, capability determining component 352, e.g., in conjunction with processor(s) 312, memory 316, transceiver 302, configuring component 342, etc., can receive the indication to support concurrent or TDM uplink transmissions over the multiple different combinations of multiple CCs. For example, capability determining component 352 can receive the indication of the capability as it applies generally to multiple CCs or to specific CCs in a band combination index field or similar indication, as described above.

In an example, in transmitting the one or more indications at Block 402, optionally at Block 410, an indication to support a carrier switching time for switching between the multiple CCs in transmitting the at least one of the multiple uplink channels can be transmitted. In an aspect, capability indicating component 252, e.g., in conjunction with processor(s) 212, memory 216, transceiver 202, communicating component 242, etc., can transmit the indication to support the carrier switching time for switching between the multiple CCs in transmitting the at least one of the multiple uplink channels. In an example, the capability can relate to a carrier switching time for each of multiple combinations of the multiple CCs. For example, the capability can be in terms of carrier switching time when UE switches PUSCH/PUCCH/SRS/PRACH across CCs in an intra/inter-band CA band combination, which can be defined in 'CA-ParametersNR' in Physical layer parameters. For example, the switching time may have multiple values for different UE capabilities, e.g., 0 microseconds (us), 35 us, 70 us, 140 us, 300 us, etc. The capability may be a Single indication field for indicating supported maximum concurrent UL TX for all UL channels, e.g., PUSCH/PUCCH/SRS/PRACH, in one example.

For example, the capability indication for an intra/inter-band CA band combination may be similar to the following:

| Switching time | Band Combination Index |
|---|---|
| 0 us | 1(CC1 + CC2) |
| 0 us | 2(CC3 + CC4) | where another UE may have a different capability:

| Switching time | Band Combination Index |
|---|---|
| 70 us | 1(CC1 + CC2) |
| 70 us | 2(CC3 + CC4) |

In an example, in receiving the one or more indications at Block 502, optionally at Block 510, an indication to support a carrier switching time for switching between the multiple CCs in transmitting the at least one of the multiple uplink channels can be received. In an aspect, capability determining component 352, e.g., in conjunction with processor(s) 312, memory 316, transceiver 302, configuring component 342, etc., can receive the indication to support the carrier switching time for switching between the multiple CCs in transmitting the at least one of the multiple uplink channels. For example, capability determining component 352 can receive the indication of the capability as it applies generally to multiple CCs or to specific CCs in a band combination index field or similar indication, as described above. This capability can be used in configuring resource grants for the UE 104 over multiple CCs, as described further herein.

In an example, in transmitting the one or more indications at Block 402, optionally at Block 412, an indication to support a number of antennas (e.g., physical antennas) or transmission layers of the at least one of the multiple uplink channels supported for each of the multiple CCs or one or more combinations of the multiple CCs can be transmitted. In an aspect, capability indicating component 252, e.g., in conjunction with processor(s) 212, memory 216, transceiver 202, communicating component 242, etc., can transmit the indication to support a number of antennas (e.g., physical antennas) or transmission layers of the at least one of the multiple uplink channels supported for each of the multiple CCs or one or more combinations of the multiple CCs. For example, the capability can be in terms of a number of physical antennas or number of supported maximum Tx layers of PUSCH/PUCCH/SRS per CC per band per band combination. For example, this capability can be defined in 'FeatureSetUplinkPerCC parameters' in Physical layer parameters. As similarly described for indicating capability to support concurrent or TDM transmissions, this capability may be a single indication field for indicating supported maximum concurrent UL TX for all UL channels, e.g., PUSCH, PUCCH, SRS, PRACH. In another example, this capability may include separate indication fields for indicating supporting maximum concurrent UL Tx for each UL channel. For example, the capability may relate to supporting the number of antennas or transmission layers for certain CCs within band combinations.

For example, the capability indication for all uplink channels may be similar to the following:

| # of uplink antennas | CC Index |
|---|---|
| N = 1 | CC1 in band combination 1 |
| N = 2 | CC2 in band combination 1 |
| N = 2 | CC1 in band combination 2 |

The capability information using separate indicates for each of one or more of the uplink channels may be similar to the following for PUSCH:

| Channel Indication | # of unlink antennas | CC Index |
|---|---|---|
| PUSCH | N = 1 | CC1 in band combination 1 |
|  | N = 2 | CC2 in band combination 1 | and/or the following for SRS:

| Channel Indication | # of unlink antennas | CC Index |
|---|---|---|
| SRS | N = 2 | CC1 in band combination 2 |
|  | N = 2 | CC2 in band combination 2 |

In an example, in receiving the one or more indications at Block 502, optionally at Block 512, an indication to support a number of antennas (e.g., physical antennas) or transmission layers of the at least one of the multiple uplink channels supported for each of the multiple CCs or one or more combinations of the multiple CCs can be received. In an aspect, capability determining component 352, e.g., in conjunction with processor(s) 312, memory 316, transceiver 302, configuring component 342, etc., can receive the indication to support a number of antennas (e.g., physical antennas) or transmission layers of the at least one of the multiple uplink channels supported for each of the multiple CCs or one or more combinations of the multiple CCs. For example, capability determining component 352 can receive the indication of the capability as it applies to all uplink channels or separate indications or capabilities for each of one or more of the uplink channels, as described above. This capability can be used in configuring resource grants for the UE 104 over multiple CCs, as described further herein.

In an example, in transmitting the one or more indications at Block 402, optionally at Block 414, an indication to support separate configuration of PCell for uplink and downlink for one or more combinations of the multiple CCs can be transmitted. In an aspect, capability indicating component 252, e.g., in conjunction with processor(s) 212, memory 216, transceiver 202, communicating component 242, etc., can transmit the indication to support separate configuration of PCell for uplink and downlink for one or more combinations of the multiple CCs. For example, the capability can include UE capabilities for supporting configuring different component carriers as PCell for DL and UL respectively in an intra/inter-band CA band combination. In an example, this can be defined in CA-ParametersNR in Physical layer parameters. This capability report can enable the base station 102 (or other network component) to configure different PCell for DL and UL separately for new capability UEs, which can increasing flexibility of CA networking deployment.

For example, the capability indication for supporting separate PCell configuration for downlink and uplink may be similar to the following:

| Supporting PCell configuration for DL and UL separately | Band Combination Index |
| --- | --- |
| TRUE | 1(CC1 + CC2) |
| TRUE | 2(CC3 + CC4) | where another UE may have a different capability:

| Supporting PCell configuration for DL and UL separately | Band Combination Index |
| --- | --- |
| FALSE | 1(CC1 + CC2) |
| FALSE | 2(CC3 + CC4) |

In an example, in receiving the one or more indications at Block 502, optionally at Block 514, an indication to support separate configuration of PCell for uplink and downlink for one or more combinations of the multiple CCs can be received. In an aspect, capability determining component 352, e.g., in conjunction with processor(s) 312, memory 316, transceiver 302, configuring component 342, etc., can receive the indication to support separate configuration of PCell for uplink and downlink for one or more combinations of the multiple CCs. For example, capability determining component 352 can receive the indication of the capability as it applies to combinations of the multiple CCs or related bands, as described above. This capability can be used in configuring cells as PCells for the UE 104 over multiple CCs, as described further herein.

In method 500, at Block 516, a configuration for the UE for transmitting over at least one of the multiple uplink channels over the multiple CCs using concurrent or TDM transmission can be determined. In an aspect, configuring component 342 and/or resource allocating component 354, e.g., in conjunction with processor(s) 312, memory 316, transceiver 302, configuring component 342, etc., can determine, based on the one or more indications, the configuration for the UE for transmitting over at least one of the multiple uplink channels over the multiple CCs using concurrent or TDM transmission. For example, resource allocating component 354 can generate resource allocations or grants for the UE 104 over the multiple CCs that comply with the received capability indicators. In one example, resource allocating component 354 may avoid scheduling the UE 104 resources that are concurrent or overlap in time for transmitting the at least one uplink channel where the capability indicates only TDM support (or otherwise no concurrent support). Similarly, for example, resource allocating component 354 can ensure that resource allocations over the multiple CCs for the UE comply with indicated carrier switching times.

In other examples, configuring component 342 can further ensure a number of physical antennas and/or transmission layers are complied with in configuring communications over the multiple carriers with the UE. Additionally, in an example, configuring component 342 may configure different PCells for uplink and downlink for the UE 104 where the capability indicates that this configuration is allowed, etc.

In method 500, at Block 518, the configuration can be transmitted to the UE based on receiving the one or more indications. In an aspect, configuring component 342, e.g., in conjunction with processor(s) 312, memory 316, transceiver 302, etc., can transmit, based on receiving the one or more indications, the configuration to the UE. For example, configuring component 342 can transmit the configuration as a resource allocation in a control channel (e.g., physical downlink control channel (PDCCH)) or as a configuration of antennas, PCell for uplink/downlink carriers, etc., in RRC or other signaling.

In method 400, at Block 416, a configuration to transmit over the at least one of the multiple uplink channels over the multiple CCs using concurrent or TDM transmission can be received based on the one or more indications. In an aspect, communicating component 242, e.g., in conjunction with processor(s) 212, memory 216, transceiver 202, etc., can receive, based on the one or more indications, the configuration to transmit over the at least one of the multiple uplink channels over the multiple CCs using concurrent or TDM transmission. For example, as described, the configuration can comply with the one or more indications of capability transmitted to the base station 102. In addition, as described, the configuration may include one or more resource allocations over the multiple CCs, an antenna or transmission layer configuration, uplink/downlink PCell configuration, etc.

In method 400, optionally at Block 418, the at least one of the multiple uplink channels can be transmitted over, based on the configuration, over the multiple CCs using concurrent or TDM transmission. In an aspect, communicating component 242, e.g., in conjunction with processor(s) 212, memory 216, transceiver 202, etc., can transmit, based on the configuration, over the at least one of the multiple uplink channels over the multiple CCs using concurrent or TDM transmission. For example, communicating component 242 can use concurrent or TDM transmission, as shown in FIG. 6 for example, based on the configuration and in compliance with the capabilities indicated in Block 402.

Figure 7:
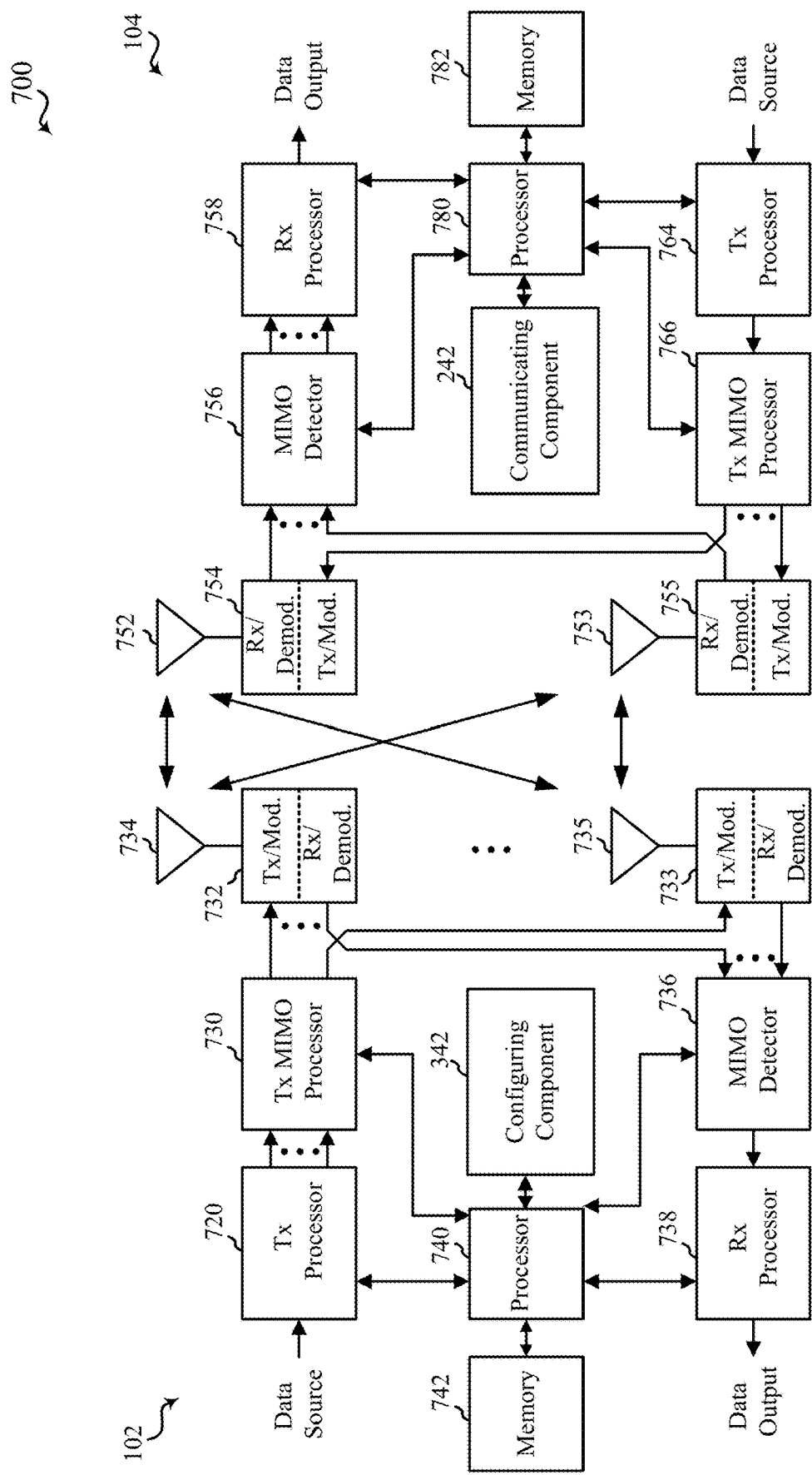
FIG. 7 is a block diagram illustrating an example of a MIMO communication system including a base station and a UE, in accordance with various aspects of the present disclosure.

FIG. 7 is a block diagram of a MIMO communication system 700 including a base station 102 and a UE 104. The MIMO communication system 700 may illustrate aspects of the wireless communication access network 100 described with reference to FIG. 1. The base station 102 may be an example of aspects of the base station 102 described with reference to FIG. 1. The base station 102 may be equipped with antennas 734 and 735, and the UE 104 may be equipped with antennas 752 and 753. In the MIMO communication system 700, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 720 may receive data from a data source. The transmit processor 720 may process the data. The transmit processor 720 may also generate control symbols or reference symbols. A transmit MIMO processor 730 may perform spatial processing (e.g., precoding) on data symbols, control symbols, or reference symbols, if applicable, and may provide output symbol streams to the transmit modulator/demodulators 732 and 733. Each modulator/demodulator 732 through 733 may process a respective output symbol stream (e.g., for OFDM, etc.) to obtain an output sample stream. Each modulator/demodulator 732 through 733 may further process (e.g., convert to analog, amplify, filter, and upconvert) the output sample stream to obtain a DL signal. In one example, DL signals from modulator/demodulators 732 and 733 may be transmitted via the antennas 734 and 735, respectively.

The UE 104 may be an example of aspects of the UEs 104 described with reference to FIGS. 1-2. At the UE 104, the UE antennas 752 and 753 may receive the DL signals from the base station 102 and may provide the received signals to the modulator/demodulators 754 and 755, respectively. Each modulator/demodulator 754 through 755 may condition (e.g., filter, amplify, downconvert, and digitize) a respective received signal to obtain input samples. Each modulator/demodulator 754 through 755 may further process the input samples (e.g., for OFDM, etc.) to obtain received symbols. A MIMO detector 756 may obtain received symbols from the modulator/demodulators 754 and 755, perform MIMO detection on the received symbols, if applicable, and provide detected symbols. A receive (Rx) processor 758 may process (e.g., demodulate, deinterleave, and decode) the detected symbols, providing decoded data for the UE 104 to a data output, and provide decoded control information to a processor 780, or memory 782.

The processor 780 may in some cases execute stored instructions to instantiate a communicating component 242 (see e.g., FIGS. 1 and 2).

On the uplink (UL), at the UE 104, a transmit processor 764 may receive and process data from a data source. The transmit processor 764 may also generate reference symbols for a reference signal. The symbols from the transmit processor 764 may be precoded by a transmit MIMO processor 766 if applicable, further processed by the modulator/demodulators 754 and 755 (e.g., for SC-FDMA, etc.), and be transmitted to the base station 102 in accordance with the communication parameters received from the base station 102. At the base station 102, the UL signals from the UE 104 may be received by the antennas 734 and 735, processed by the modulator/demodulators 732 and 733, detected by a MIMO detector 736 if applicable, and further processed by a receive processor 738. The receive processor 738 may provide decoded data to a data output and to the processor 740 or memory 742.

The processor 740 may in some cases execute stored instructions to instantiate a configuring component 342 (see e.g., FIGS. 1 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 700. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 700.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, hardwiring, or combinations of any of these. Features implementing functions may also be physically located at various positions, including being distributed such that portions of functions are implemented at different physical locations. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. Also, as used herein, including in the claims, "or" as used in a list of items prefaced by "at least one of" indicates a disjunctive list such that, for example, a list of "at least one of A, B, or C" means A or B or C or AB or AC or BC or ABC (A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

In the following, an overview of further examples of the present invention is provided:

1. A method for wireless communication, comprising:
transmitting an indication of a capability to support concurrent or time division multiplexed uplink transmission of at least one of multiple uplink channels across multiple component carriers; and
receiving, based on the indication, a configuration to transmit over the at least one of the multiple uplink channels over the multiple component carriers using concurrent transmission or time division multiplexed transmission.

2. The method of example 1, wherein the indication indicates separate capabilities to support the concurrent or time division multiplexed uplink transmission of the at least one of multiple uplink channels over multiple different combinations of the multiple component carriers.

3. The method of any of examples 1 or 2, wherein the indication corresponds to all of the multiple uplink channels.

4. The method of example 3, wherein the multiple uplink channels include a physical uplink shared channel, a physical uplink control channel, a sounding reference signal, and a physical random access channel.

5. The method of any of examples 1 to 4, wherein the indication indicates separate capabilities for each of the multiple uplink channels.

6. The method of any of examples 1 to 5, further comprising transmitting a second indication of a carrier switching capability of a carrier switching time supported for switching transmitting of the at least one of the multiple uplink channels between the multiple component carriers.

7. The method of any of examples 1 to 6, further comprising transmitting a second indication of at least one of a number of physical antennas or a number of transmission layers of the at least one of the multiple uplink channels supported for each of the multiple component carriers or each of multiple combinations of the multiple component carriers.

8. The method of example 7, wherein the second indication corresponds to all of the multiple uplink channels.

9. The method of any of examples 7 or 8, wherein the second indication indicates separate capabilities for each of the multiple uplink channels.

10. The method of any of examples 1 to 9, further comprising transmitting a second indication of a second capability of whether separate primary cell (PCell) configuration for downlink and uplink is supported for one or more combinations of the multiple component carriers.

11. The method of any of examples 1 to 10, wherein the configuration includes one or more resources grants indicating resources over which to transmit the at least one of the multiple uplink channels over at least a portion of the multiple component carriers.

12. A method for wireless communication, comprising:
receiving, from a user equipment (UE), an indication of a capability to support concurrent or time division multiplexed uplink transmission of at least one of multiple uplink channels across multiple component carriers;
determining, based on the indication, a configuration for the UE for transmitting over the at least one of the multiple uplink channels over the multiple component carriers using concurrent transmission or time division multiplexed transmission; and
transmitting, based on the indication, the configuration to the UE.

13. The method of example 12, wherein the indication indicates separate capabilities to support the concurrent or time division multiplexed uplink transmission of the at least one of multiple uplink channels over multiple different combinations of the multiple component carriers.

14. The method of any of examples 12 or 13, wherein the indication corresponds to all of the multiple uplink channels.

15. The method of example 14, wherein the multiple uplink channels include a physical uplink shared channel, a physical uplink control channel, a sounding reference signal, and a physical random access channel.

16. The method of any of examples 12 to 15, wherein the indication indicates separate capabilities for each of the multiple uplink channels.

17. The method of any of examples 12 to 16, further comprising receiving a second indication of a carrier switching capability of a carrier switching time supported for switching transmitting of the at least one of the multiple uplink channels between the multiple component carriers.

18. The method of any of examples 12 to 17, further comprising receiving a second indication of at least one of a number of physical antennas or a number of transmission layers of the at least one of the multiple uplink channels supported for each of the multiple component carriers or each of multiple combinations of the multiple component carriers.

19. The method of example 18, wherein the second indication corresponds to all of the multiple uplink channels.

20. The method of any of examples 18 or 19, wherein the second indication indicates separate capabilities for each of the multiple uplink channels.

21. The method of any of examples 12 to 20, further comprising receiving a second capability of whether separate primary cell (PCell) configuration for downlink and uplink is supported for one or more combinations of the multiple component carriers.

22. The method of any of examples 12 to 21, wherein the configuration includes one or more resources grants indicating resources over which to transmit the at least one of the multiple uplink channels over at least a portion of the multiple component carriers.

23. An apparatus for wireless communication, comprising:
a transceiver;
a memory configured to store instructions; and
one or more processors communicatively coupled with the transceiver and the memory, wherein the one or more processors are configured to execute the instructions to perform the operations of one or more methods in examples 1 to 22.

24. An apparatus for wireless communication, comprising means for performing the operations of one or more methods in examples 1 to 22.

25. A computer-readable medium, comprising code executable by one or more processors to perform the operations of one or more methods in examples 1 to 22.

What is claimed is:

1. A method for wireless communication, comprising:
transmitting a capability indication including, for each band combination of multiple band combinations, an indication field indicating a capability to support concurrent or time division multiplexed uplink transmission of an uplink channel across multiple component carriers of the band combination;
transmitting a second indication of at least one of a number of physical antennas or a number of transmission layers of the uplink channel supported for each of the multiple component carriers or each of multiple combinations of the multiple component carriers; and
receiving, based on the capability indication and the second indication, a configuration to transmit over the uplink channel over the multiple component carriers of one of the multiple band combinations using concurrent transmission or time division multiplexed transmission.

2. The method of claim 1, wherein the capability indication indicates separate capabilities to support the concurrent or time division multiplexed uplink transmission of the uplink channel over the multiple band combinations.

3. The method of claim 1, wherein the capability indication indicates separate capabilities for each of multiple uplink channels including the uplink channel.

4. The method of claim 1, further comprising transmitting a third indication of a carrier switching capability of a carrier switching time supported for switching transmitting of the uplink channel between the multiple component carriers of one of the multiple band combinations.

5. The method of claim 1, wherein the second indication indicates separate capabilities for each of multiple uplink channels including the uplink channel.

6. The method of claim 1, further comprising transmitting a third indication of a second capability of whether separate primary cell (PCell) configuration for downlink and uplink is supported for one or more of the multiple band combinations.

7. A method for wireless communication, comprising:
receiving, from a user equipment (UE), a capability indication including, for each band combination of multiple band combinations, an indication field indicating a capability to support concurrent or time division multiplexed uplink transmission of an uplink channel across multiple component carriers of the band combination;
determining, based on the capability indication, a configuration for the UE for transmitting over the uplink channel over the multiple component carriers of one of the multiple band combinations using concurrent transmission or time division multiplexed transmission; and
transmitting, based on the capability indication, the configuration to the UE.

8. The method of claim 7, wherein the capability indication indicates separate capabilities to support the concurrent or time division multiplexed uplink transmission of the uplink channel over the multiple band combinations.

9. The method of claim 7, further comprising receiving a second indication of a carrier switching capability of a carrier switching time supported for switching transmitting of the uplink channel between the multiple component carriers of one of the multiple band combinations.

10. An apparatus for wireless communication, comprising:
a transceiver;
a memory configured to store instructions;
one or more processors communicatively coupled with the memory and the transceiver, wherein the one or more processors are configured to:
transmit a capability indication including, for each band combination of multiple band combinations, an indication field indicating a capability to support concurrent or time division multiplexed uplink transmission of an uplink channel across multiple component carriers of the band combination;
transmit a second indication of at least one of a number of physical antennas or a number of transmission layers of the uplink channel supported for each of the multiple component carriers or each of multiple combinations of the multiple component carriers; and
receive, based on the capability indication and the second indication, a configuration to transmit over the uplink channel over the multiple component carriers of one of the multiple band combinations using concurrent transmission or time division multiplexed transmission.

11. The apparatus of claim 10, wherein the capability indication indicates separate capabilities to support the concurrent or time division multiplexed uplink transmission of the uplink channel over the multiple band combinations.

12. The apparatus of claim 10, wherein the indication corresponds to multiple uplink channels including the uplink channel.

13. The apparatus of claim 12, wherein the multiple uplink channels include a physical uplink shared channel, a physical uplink control channel, a sounding reference signal, and a physical random access channel.

14. The apparatus of claim 10, wherein the capability indication indicates separate capabilities for each of multiple uplink channels including the uplink channel.

15. The apparatus of claim 10, wherein the one or more processors are further configured to transmit a third indication of a carrier switching capability of a carrier switching time supported for switching transmitting of the uplink channel between the multiple component carriers of one of the multiple band combinations.

16. The apparatus of claim 10, wherein the second indication corresponds to multiple uplink channels including the uplink channel.

17. The apparatus of claim 10, wherein the second indication indicates separate capabilities for each of multiple uplink channels including the uplink channel.

18. The apparatus of claim 10, wherein the one or more processors are further configured to transmit a third indication of a second capability of whether separate primary cell (PCell) configuration for downlink and uplink is supported for one or more of the multiple band combinations.

19. The apparatus of claim 10, wherein the configuration includes one or more resources grants indicating resources over which to transmit the uplink channel over at least a portion of the multiple component carriers of one of the multiple band combinations.

20. An apparatus for wireless communication, comprising:
a transceiver;
a memory configured to store instructions;
one or more processors communicatively coupled with the memory and the transceiver, wherein the one or more processors are configured to:
receive, from a user equipment (UE), a capability indication including, for each band combination of multiple band combinations, an indication field indicating a capability to support concurrent or time division multiplexed uplink transmission of an uplink channel across multiple component carriers of the band combination;
determine, based on the capability indication, a configuration for the UE for transmitting over the uplink channel over the multiple component carriers of one of the multiple band combinations using concurrent transmission or time division multiplexed transmission; and
transmit, based on the capability indication, the configuration to the UE.

21. The apparatus of claim 20, wherein the capability indication indicates separate capabilities to support the concurrent or time division multiplexed uplink transmission of the uplink channel over the multiple band combinations.

22. The apparatus of claim 20, wherein the capability indication corresponds to multiple uplink channels including the uplink channel.

23. The apparatus of claim 22, wherein the multiple uplink channels include a physical uplink shared channel, a physical uplink control channel, a sounding reference signal, and a physical random access channel.

24. The apparatus of claim 20, wherein the capability indication indicates separate capabilities for each of multiple uplink channels including the uplink channel.

25. The apparatus of claim 20, wherein the one or more processors are further configured to receive a second indication of a carrier switching capability of a carrier switching time supported for switching transmitting of the uplink channel between the multiple component carriers of one of the multiple band combinations.

26. The apparatus of claim 20, wherein the one or more processors are further configured to receive a second indication of at least one of a number of physical antennas or a number of transmission layers of the uplink channel supported for each of the multiple component carriers or each of multiple combinations of the multiple component carriers.

27. The apparatus of claim 26, wherein the second indication corresponds to multiple uplink channels including the uplink channel.

28. The apparatus of claim 26, wherein the second indication indicates separate capabilities for each of multiple uplink channels including the uplink channel.

29. The apparatus of claim 20, wherein the one or more processors are further configured to receive a second indication of a second capability of whether separate primary cell (PCell) configuration for downlink and uplink is supported for one or more of the multiple band combinations.

30. The apparatus of claim 20, wherein the configuration includes one or more resources grants indicating resources over which to transmit the uplink channel over at least a portion of the multiple component carriers of one of the multiple band combinations.

* * * * *